April 5, 1932.   F. C. COSEO   1,852,698
CASING FOR ELECTRIC APPARATUS
Original Filed Dec. 16, 1925
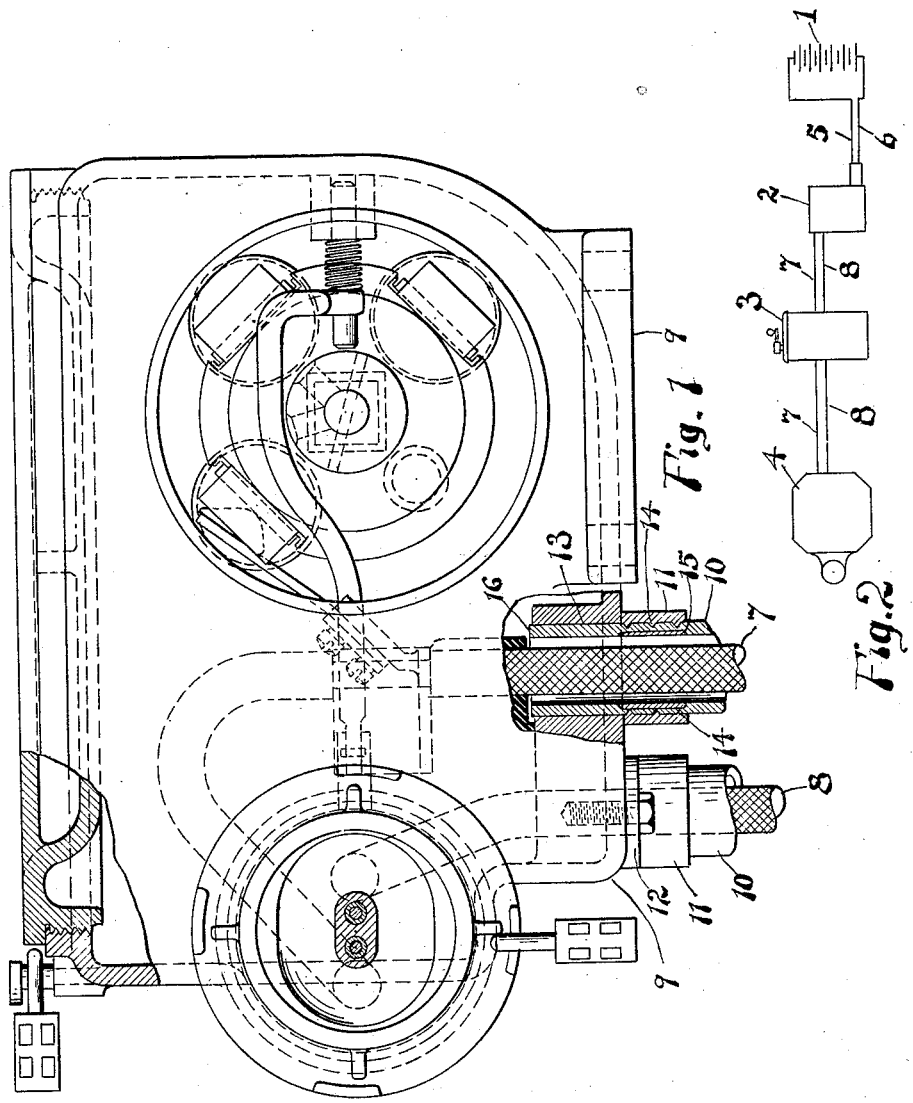

Patented Apr. 5, 1932

1,852,698

UNITED STATES PATENT OFFICE

FREDERICK C. COSEO, OF COLUMBUS, OHIO, ASSIGNOR TO THE JEFFREY MANUFACTURING COMPANY, OF COLUMBUS, OHIO, A CORPORATION OF OHIO

CASING FOR ELECTRIC APPARATUS

Original application filed December 16, 1925, Serial No. 75,828. Divided and this application filed October 19, 1928. Serial No. 313,627.

The present invention relates to certain new and useful improvements in casings for electric apparatus, and particularly to casings adapted to protect the electric equipment of locomotives, and other machinery especially designed for use in coal mines, and similar installations, from contact with the explosive gases encountered in the mine.

It is the especial object of this invention to provide efficient and durable means for connecting the conduits through which the conductors of the circuits extend, with the explosion proof casings of the motors, controllers and the like.

The means whereby I attain this object are fully set forth in the following specification and illustrated in the accompanying drawings of which Fig. 1 is an external view, partly in section, of a totally enclosed fuse cut-out equipped with the devices of my invention.

Fig. 2 is a diagram of the electric equipment of a locomotive of approved design for use in the gas charged atmosphere of a coal mine.

Like numerals refer to similar parts in both figures.

Many coal mines are so subject to accumulations of explosive gas that the use of electric apparatus therein is permissible only upon compliance with the most stringent precautions to prevent the ignition of the gaseous atmosphere by arcs formed incidental to the operation of the apparatus. To this end explosion proof casings have been devised for motors, and accessory appliances, and these casings when spaced from each other are connected by gas proof conduits through which extend the conductors of the electric locomotives.

In my co-pending application, Ser. No. 75,828, filed Dec. 16, 1925, of which this application is a division, I have shown an electric cut-out enclosed in an explosion proof case to which is connected two conduits equipped with the devices of my present invention. To facilitate the description of these devices I have provided, in Fig. 2 of the drawings, a diagrammatic illustration of the principal electric circuits of a locomotive adapted to the haulage of coal in a mine. In this diagram the numeral 1 indicates a storage battery, or other suitable and convenient source of electric current supply. The numeral 2 indicates as an entirety a cut-out, the numeral 3 a controller of the common and well known type whereby the flow of electric current may be regulated in the motor 4. The battery 1 is connected with the cut-out 2 by two conductors 5 and 6 which are preferably encased in a flexible conductor cable of the type commonly used in coal mining apparatus, and the cut-out 2 is connected with the controller 3 and the motor 4 through the conductors 7 and 8 which are preferably a part of the permanent locomotive. In Fig. 1 of the drawings the numeral 9 refers to an explosion proof casing within which is enclosed the cut-out and similar casings are provided for the controller 3 and the motor 4.

In order to complete the gas proof enclosure of the apparatus, I have provide conduits 10 extending from the casing 9 of the cut-out 2 to the gas tight casing of the controller 3 and the motor 4. These conduits 10 are preferably formed of flexible tubing such for example as rubber and fabric hose, which is impervious to gas and affords desirable mechanical protection against abrasion of the insulation of the enclosed conductors. Adjacent the end of the conduit 10 is placed a coupling fitting having a cylindrical sleeve 11 which closely fits the outside of the conduit, and a flange 12 which is faced to form a gas tight joint with a suitable finished surface surrounding an aperture 13 of the casing 9, and is securely clamped thereto by suitable machine screws. On the inner surface of the sleeve 11 there are formed one or more annular ribs 14 adapted to be forced into the material of the conduit by the expansion of a cylindrical thimble 15 which is rolled into the conduit when the parts are assembled, to securely hold the parts together and insure the joint against leakage.

It will be noted that the casing aperture 13 is bounded inwardly of the casing by a circumferential collar. A projecting end 16 of the conduit extends through the aperture 13 to form a liner for the collar, this liner being designed to afford mechanical protection for the insulation of the conductor, and also to provide additional protection against leakage between the casing and sleeve.

The connections of the conduit 8 with the casing of the controller, motor, or other elements of the apparatus, may be made in the same manner as with the cut-out 2 thereby providing a complete unitary system of protection from explosion for the entire apparatus.

What I claim is:

In an apparatus of the class described, the combination with a casing having an aperture bounded inwardly of the casing by a circumferential collar, of a flexible tube, and means for securing said tube to said casing in communicating relation with the interior of the latter through said aperture, said means comprising a cylindrical sleeve closely surrounding said tube adjacent an end thereof, a cylindrical thimble within the tube expanded to force the walls of the latter against the inner surfaces of said sleeve without distorting the end of the tube, and means to attach said sleeve to said casing, the end of the tube projecting inwardly of the casing to form a liner for said collar.

In testimony whereof I have hereunto set my hand.

FREDERICK C. COSEO.